Dec. 6, 1966   H. KLAUE   3,289,795
DISK BRAKE

Filed Oct. 23, 1964   5 Sheets-Sheet 1

INVENTOR.
HERMANN KLAUE
BY
McGlew & Toren
ATTORNEYS

Dec. 6, 1966  H. KLAUE  3,289,795
DISK BRAKE

Filed Oct. 23, 1964  5 Sheets-Sheet 2

INVENTOR.
HERMANN KLAUE
BY
McKew & Toren
ATTORNEYS.

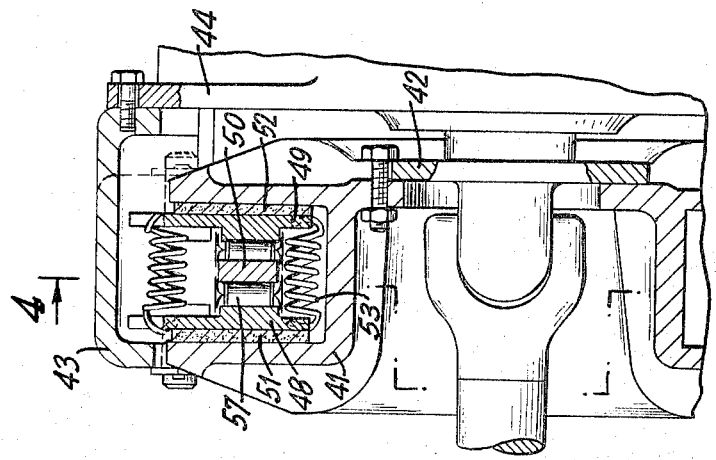
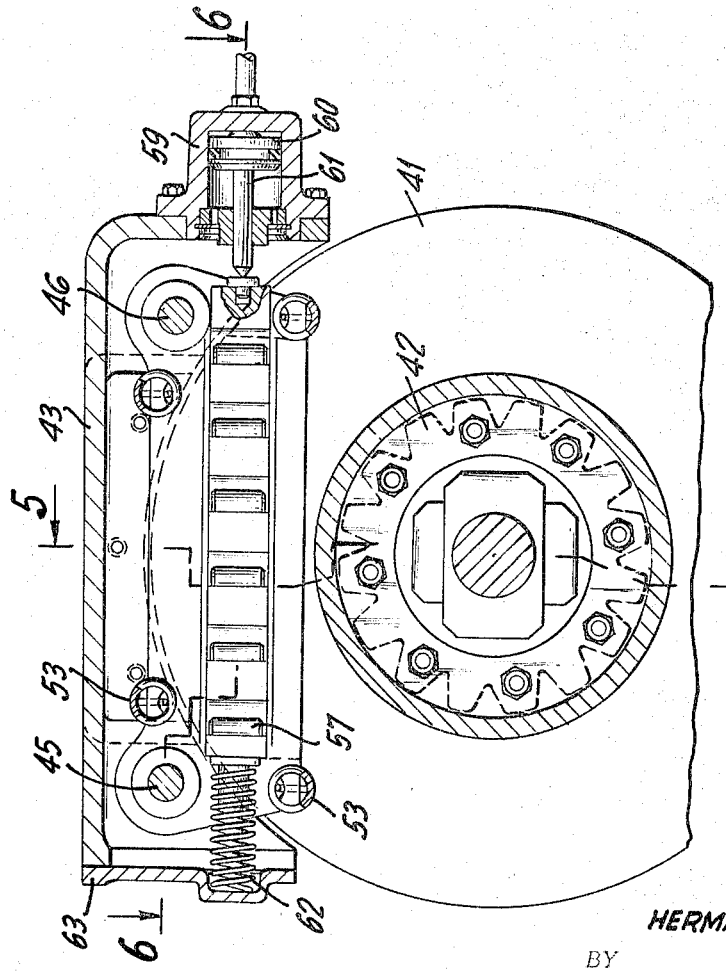

Dec. 6, 1966  H. KLAUE  3,289,795
DISK BRAKE
Filed Oct. 23, 1964  5 Sheets-Sheet 4

INVENTOR.
HERMANN KLAUE
BY
McGlew & Toren
ATTORNEYS.

Dec. 6, 1966  H. KLAUE  3,289,795
DISK BRAKE
Filed Oct. 23, 1964  5 Sheets-Sheet 5

INVENTOR.
HERMANN KLAUE
BY
ATTORNEYS.

United States Patent Office 3,289,795
Patented Dec. 6, 1966

3,289,795
DISK BRAKE
Hermann Klaue, Konstanz (Bodensee), Germany
Filed Oct. 23, 1964, Ser. No. 406,038
Claims priority, application Germany, Feb. 27, 1964,
K 52,216; Mar. 24, 1964, K 52,483
7 Claims. (Cl. 188—72)

This invention relates to disc brakes, such as used on automotive vehicles, and, more particularly, to an improved disc brake in which oppositely facing brake shoes are selectively forced into frictional engagement with cooperating brake discs by wedge means displaceable longitudinally between said brake shoes.

One of the problems encountered with disc brakes has been that of making the brake assembly sufficiently compact that it can be accommodated in and used with wheels of very small diameter, such as used on very small vehicles. Another problem encountered with disc brakes is that of providing for ready access to the brake assembly and for ready removal thereof from the wheel assembly for repair or replacement. Additionally, it has long been sought to simplify disc brake assemblies, to decrease their weight, and to reduce their costs.

Accordingly, an object of the present invention is to provide an improved disc brake for automotive vehicles in which the operating parts of the brake are located on the exterior of the brake housing so as to permit use of a housing smaller than those in current use.

To attain this object, in accordance with the present invention, a wedge means for expanding the brake shoes against braking disc means is constructed and arranged for operation in a plane perpendicular to the brake axis and along a secant or chord of the circular outer periphery of the brake housing. This arrangement has the the additional advantage that the brake operating wedge means can be formed with a series of stepped wedge surfaces so that, instead of merely one pair of rollers being used to transmit the expanding force to the brake shoes, several such pairs of rollers may be used. The inventive brake can be operated hydraulically, mechanically, or both hydraulically and mechanically.

Another object of the invention is to provide a disc brake in which the lined brake shoes may be readily interchanged or replaced.

To attain this object, in accordance with the invention a brake unit, which is supported by springs and which includes the lined brake shoes and the operating wedge means therefore, is mounted, for axial displacement and so as to be removable, on two bolts located in a brake carrier partially surrounding the brake housing and channel-shape in cross section. At one end of this brake carrier, there is fixed a hydraulic control means, such as a hydraulic actuator, and a cover plate is fixed on the opposite end thereof. By releasing and removing the bolts, and removing the cover, the brake unit may be readily dismounted from the wheel assembly.

A further object of the invention is to provide an improved disc brake which is greatly simplified in construction, can be made more inexpensively, and whose weight is substantially reduced in comparison to known disc brakes.

To attain this object of the invention, the brake carrier preferably comprises a casting of light metal. This carrier mounts the lined brake shoes and also contains the brake operating cylinder in a cylindrical extension thereof. The brake carrier is preferably formed integrally with the brake cylinder and is supported on a sheet metal holder which is stationarily connected with a fixed part of the vehicle such as, for example, an axle housing. By forming outwardly opening slotted apertures in the sheet metal holder, it is possible easily to remove the brake carrier from the brake housing for changing the lined brake shoes.

For an understanding of the principles of the invention, reference is made to the following description of typical embodiments thereof as illustrated in the accompanying drawings.

In the drawings:

FIG. 4 is a longitudinal sectional view, taken on the line 4—4 of FIG. 5, and illustrating another embodiment of a disc brake in accordance with the invention;

FIG. 5 is a cross sectional view of the disc brake shown in FIG. 4 and taken on the line 5—5 of FIG. 4;

Figure 1:
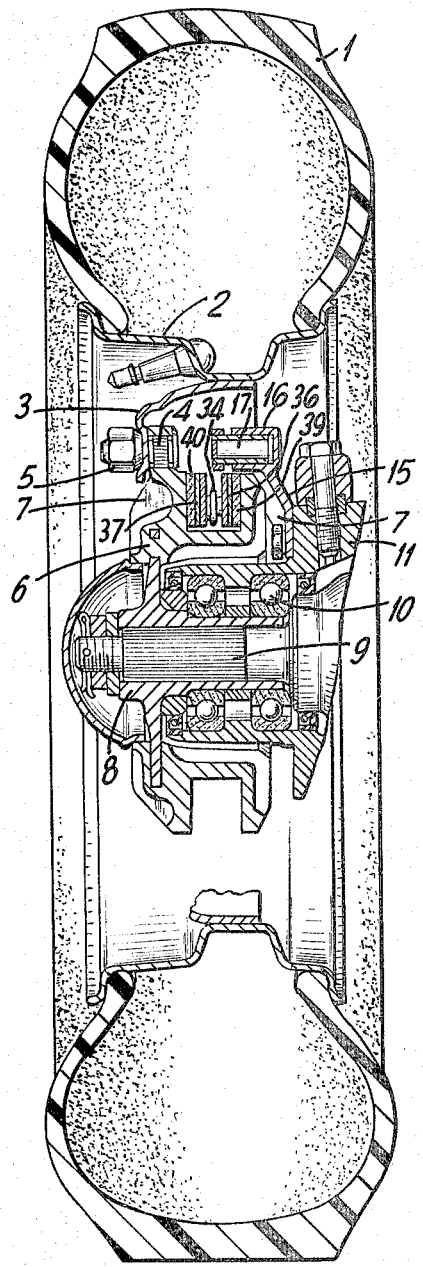
FIG. 1 is a cross sectional view, taken on the line 1—1 of FIG. 2, through the front wheel of a passenger automobile in which the front wheels are driven and the brakes are hydraulically controlled.
Figure 2:
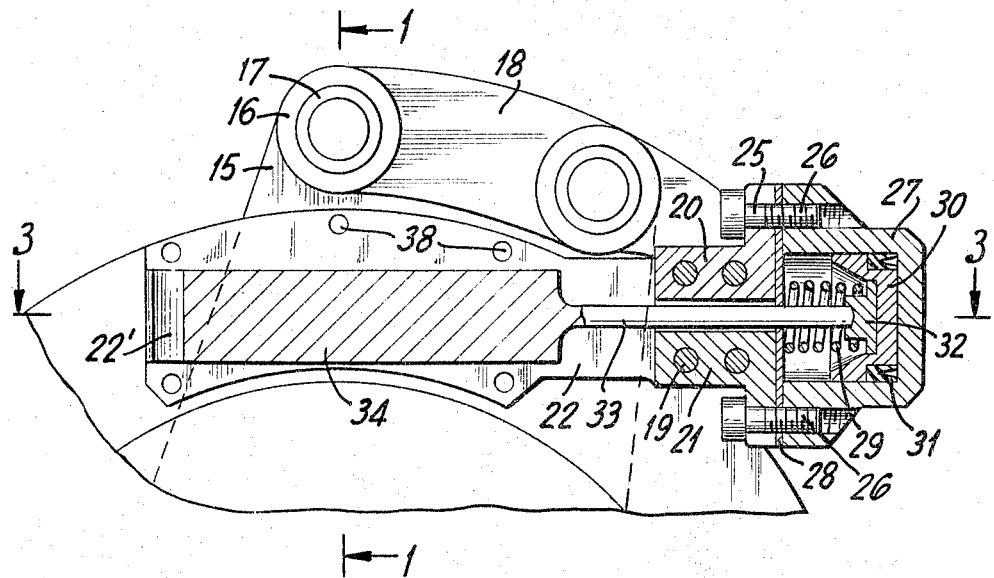
FIG. 2 is an enlarged partial longitudinal sectional view, taken on the line 2—2 of FIG. 3, through the brake shoes of the brake shown in FIG. 1.
Figure 3:
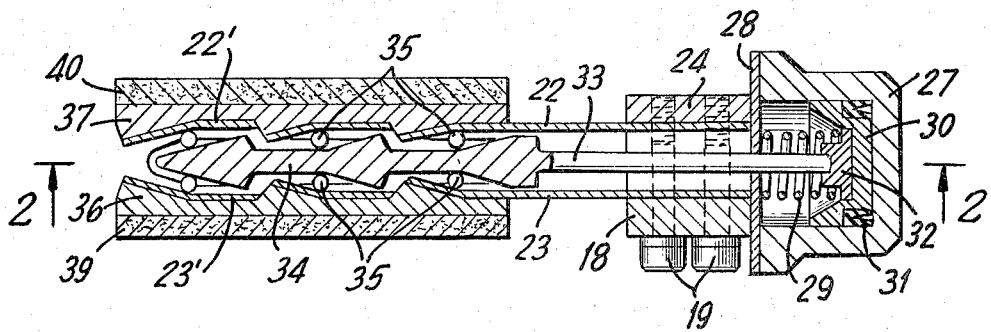
FIG. 3 is a cross sectional view, taken on the line 3—3 of FIG. 2, through the brake shoes and the operating or expanding means therefore.

Referring first to the embodiment of the invention shown in FIGS. 1-3, a tire 1 is illustrated as mounted on a rim 2 of a dished wheel 3 secured to a brake housing 6 by bolts 4 and nuts 5. Housing 6 has radial ribs 7 for strengthening purposes and furthermore for improving heat radiation therefrom. Brake housing 6 is cast integral with a flanged hub member 8 drivingly secured to an axle 9 by interengaged splines. The illustrated wheel is a front wheel which is rotatably mounted in a steering knuckle 11 by anti-friction bearings 10.

The fixed parts of the disc brake are secured to a brake carrier 15 which is secured to steering knuckle 11 by screws or bolts. In the embodiment of the invention shown in FIGS. 1, 2 and 3, brake carrier 15 is formed with spaced tubular lateral extensions 16 which receive carrier bolts 17 connected with an arm 18. By means of screws 19, arm 18 supports the actual brake unit comprising the lined brake shoes and the wedge means or operator for expanding the same. Screws 19 interconnect brake arm or rod 18, connection pieces 20, 21, two resilient sheet metal holders 22 and 23, and a counter plate 24 which is tapped for threaded engagement therein of screws 19. Connecting members 20 and 21 have extensions formed with bores, transverse to the bores receiving screws 19, and which receive screws 25 and 26. These latter screws connect the connecting members 20, 21, and thus brake arm 18, to the brake operating cylinder 27.

A plate 28 is disposed between brake operating cylinder 27 and the connection pieces 20 and 21, and this plate forms a seat for a compression spring 29 which biases a hydraulic piston 30 outwardly or to the right as shown in FIGS. 2 and 3. A sleeve 31 is provided in the brake erating cylinder to seal the cylinder to receive oil under pressure. Through a pressure seal member 32, piston 30 acts on a drive rod 33 which is integral with a stepped wedge brake operating member 34.

In the embodiment of FIGS. 1, 2 and 3, the stepped edge member 34 has three successive pairs of inclined tracks or wedge surfaces which are engaged by rollers 35. Rollers 35 also engage corresponding tracks or wedge surfaces on the lined brake shoes 36 and 37. In order that the brake shoes can be made, for example, from die castings of light metal, sheet metal holders 22 and 23 are provided with punched out tongues 22′, 23′ which interlock with the projections forming the inclined tracks or wedge surfaces of the brake shoes. Brake shoes 36 and 37 are connected by rivets 38 to holders 22 and 23, and are provided with friction linings 39 and 40, respectively, which are brought into frictional contact, during braking, with the rotating brake housing 6, such contact being effected by movement of wedge member or operator 34 to expand brake shoes 36 and 37, or move them away from each other.

From the foregoing, it will be noted that the force exerted on the wedge member or brake operator 34 is directed along a chord or secant of the circular outer periphery of the brake housing 6. This results in a very compact construction of the disc brake. Furthermore, by loosening and withdrawing bolts 19, the entire braking assembly may be removed from support arm 18, after removal of wheel 3, for replacement or repair of brake shoes 36 and 37.

Figure 6:
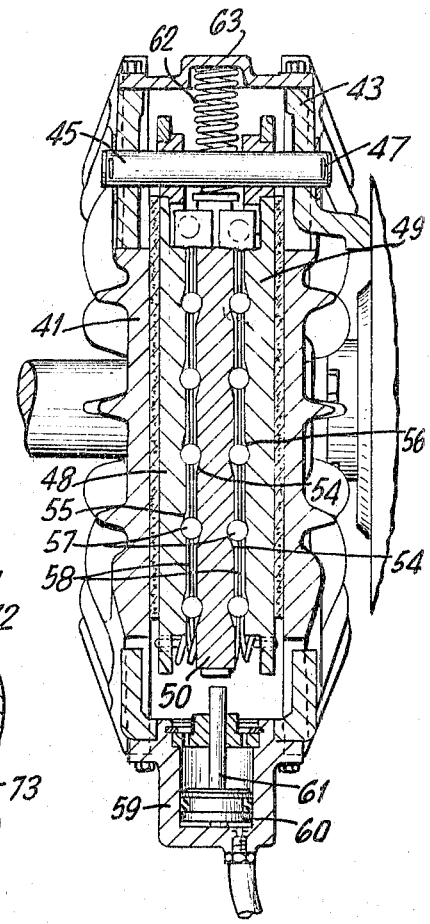
FIG. 6 is a sectional view, taken along the line 6—6 of FIG. 4, through the brake unit and at the plane of the operating wedge.
Figure 7:
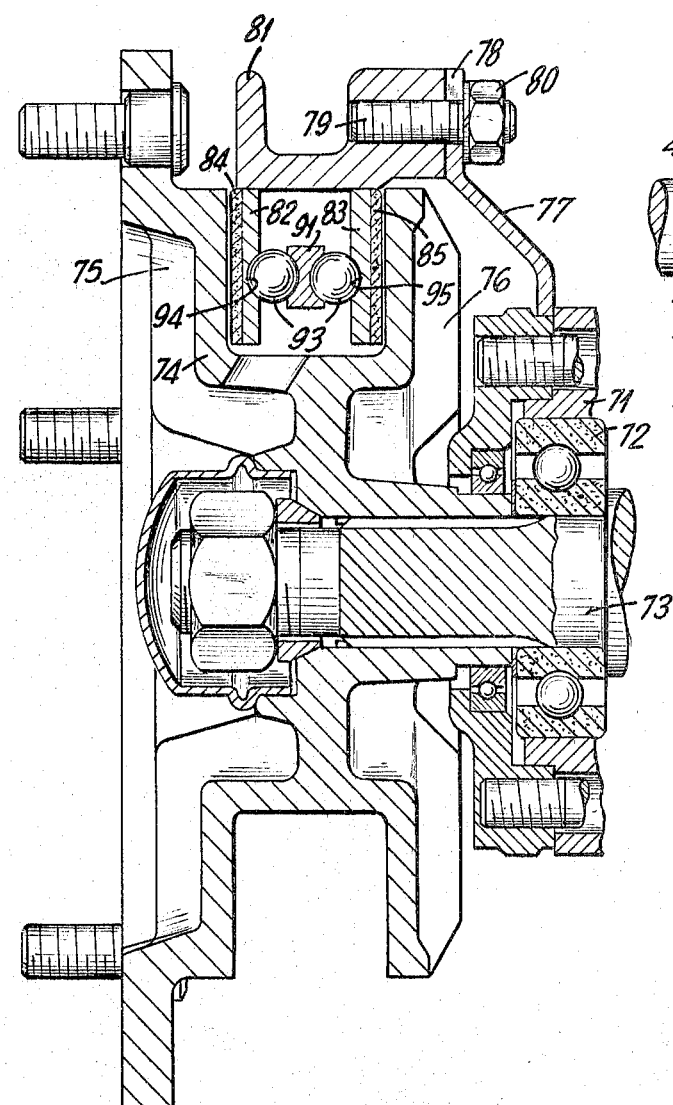
FIG. 7 is a cross sectional view, taken on the line 7—7 of FIG. 9, through another embodiment of a disc brake in accordance with the invention.
Figure 8:
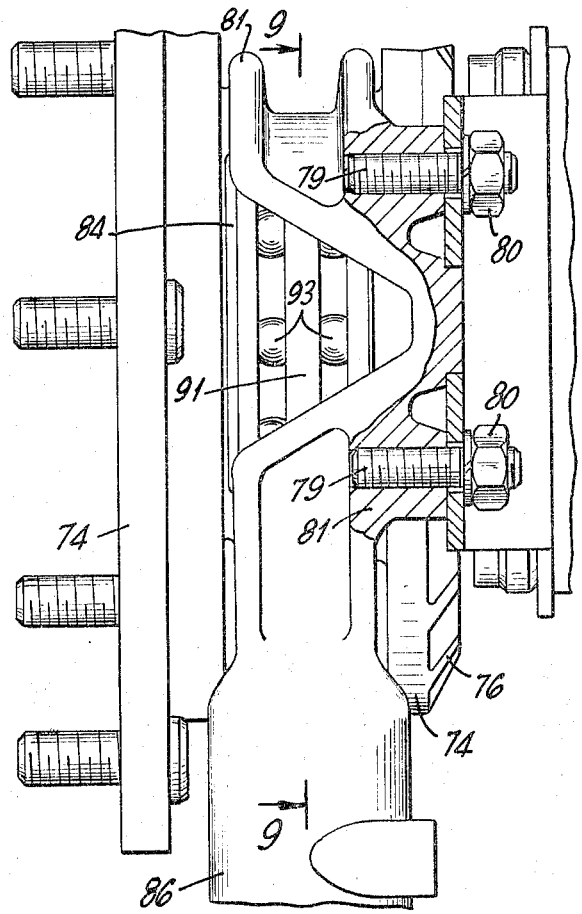
FIG. 8 is a plan view corresponding to FIG. 7, and cut away at the point of connection of the unit to a sheet-metal holder.
Figure 9:
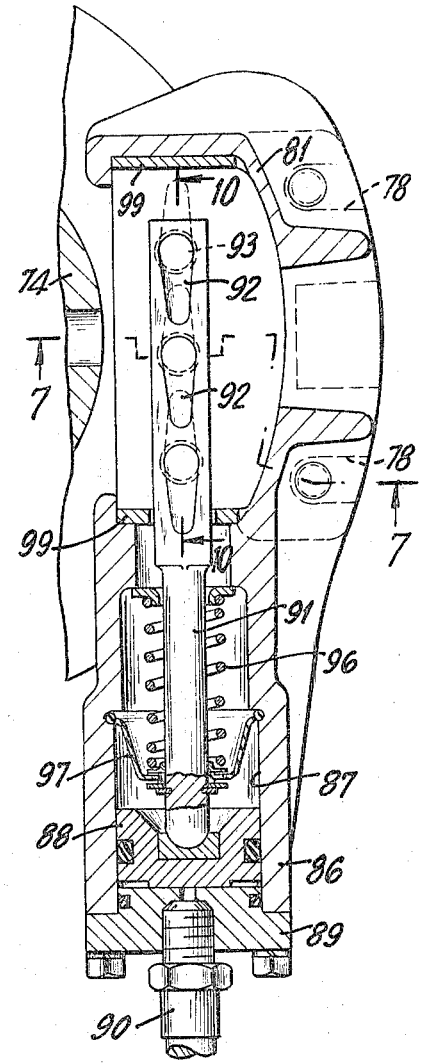
FIG. 9 is a longitudinal sectional view, taken on the line 9—9 of FIG. 8, through the brake carrier and with the brake cylinder and brake shoes shown in FIG. 7.
Figure 10:
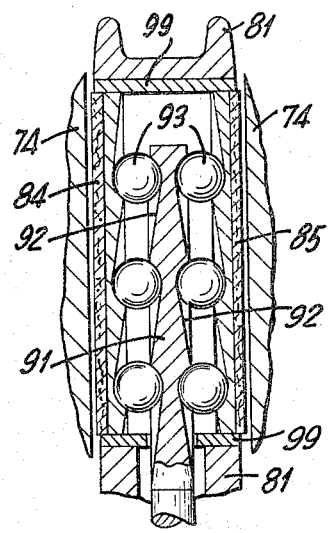
FIG. 10 is a cross sectional view, taken on the line 10—10 of FIG. 9, through the brake shoes, operating wedge, and rolling coupling members of the disc brake shown in FIG. 7.

In the embodiment shown in FIGS. 4, 5 and 6, as well as in the embodiment shown in FIGS. 1, 2 and 3, the brake housing is channel-shaped in cross section and is closed as its radially inner side. The brake housing 41, shown in FIGS. 4, 5 and 6, is bolted to the flange 42 of a driving axle. A channel cross section brake carrier 43 is fixedly connected with the axle housing 44 of the vehicle, and supports the brake unit by means of pins or bolts 45 and 46 which are secured in position by means of cotter pins 47 extending through opposite ends thereof.

The brake unit comprises the two brake shoes 48 and 49 and an operator or wedge member 50 disposed between the brake shoes. Brake shoes 48 and 49 have friction linings 51 and 52, respectively, and tension springs 53, connected between the two brake shoes, bias the latter toward each other and toward operator 50. Operator 50 is stepped, as best seen in FIG. 6, to provide inclined tracks or wedge surfaces 54 opposite which are disposed corresponding inclined tracks or wedge surfaces 55 and 56 of brake shoes 48 and 49, respectively. Rollers 57 are positioned between operator 50 and each of the brake shoes, the number of rollers being equal to the number of pairs of cooperating wedge surfaces. Rollers 57 are retained by cages 58.

A brake operating hydraulic cylinder 59 is secured to one end, such as the front end, of brake carrier 43. Cylinder 59 has disposed therein a hydraulic piston 60 which, through a drive rod 51, moves operator 50 in a direction transverse to the braking axis and along a secant or chord of the circular external periphery of brake housing 41. Upon the release of hydraulic pressure from cylinder 59, wedge 50 and piston 60 are restored to their inoperative or retracted position by means of a compression spring 62. Spring 62 is engaged between one end of operator 50 and a cover 63 which is removably secured to the end of the brake carrier opposite hydraulic cylinder 59. To dismantle the brake unit, for example to change a brake lining, it is necessary only to remove cover 63 and, after removing cotter pins 47 and retracting bolts 45, 46 from brake carrier 43, the entire brake unit can be removed from the channel-shaped carrier 43.

FIGS. 7–10 illustrate a disc brake embodying the invention and which is associated with the axle housing 71 and axle 73 of a vehicle, axle 73 being rotatably supported in axle housing 71 by means of anti-friction bearings 72. A brake housing 74 having disc braking surfaces formed in a channel-shaped peripheral portion thereof, is secured to rotate with axle 73. Housing 74 has radial ribs 75 and 76 for strengthening purposes and also to increase the heat dissipation therefrom during rotation of housing 74.

A sheet metal holder member 77 is non-rotatably secured to axle housing 71, and its periphery is formed with a plurality of outwardly opening substantially radial slots 78. A brake carrier 81 is secured to holder 77 by means of stud bolts 79 and nuts 80, the stud bolts being inserted through slots 78. Brake carrier 81 supports brake shoes 82 and 83 in the channel-shaped portion thereof, these brake shoes having brake linings 84 and 85 thereon, respectively.

Carrier 81 has an extension 86 at one end thereof and this extension defines a brake operating cylinder 87 operatively associated with a piston 88. A removable cover 89 closes the outer end of cylinder 87, and hydraulic operating fluid may be introduced into the cylinder in any suitable manner, for example through an inlet pipe or conduit 90 connected to removable cover 89 which is apertured in alignment with conduit 90. Piston 88 is operatively associated with a wedge type operator 91 for operating brake shoes 82 and 83. Operator 91 is stepped to provide inclined tracks or wedge surfaces 92 cooperable with ball bearings 93. During braking, these ball bearings roll along inclined or wedge surfaces 94 and 95 on the brake shoes 82 and 83, respectively. Thereby, when operator 91 is moved upwardly, as viewed in FIG. 10, brake shoes 82 and 83 are moved away from each other in a direction to frictionally engage, with their linings 84 and 85, respectively, the flanges of the channel cross section of brake housing 74. A spring 96 biases piston 88 to the retracted position after completion of the braking action, and a sleeve 97 is provided to prevent brake dust entering the brake operating cylinder.

Since, in the embodiment of FIGS. 7–10, the brake carrier is made from relatively light metal, sheet metal elements 99 are provided to abut the ends of brake shoes 82 and 83 to absorb the braking torque operation. In order to change the linings of the brake shoes, nuts 80 may be loosened, thus providing for brake carrier 81 to be removed by virtue of the slotted portions 78 of the sheet metal holder 77.

While specific embodiments of the invention have been shown and described in detail to illustrate the application of the principles of the invention, it will be understood that the invention may be embodied otherwise without departing from such principles.

What is claimed is:

1. A disc brake, particularly for automotive vehicles, comprising, in combination, a brake housing rotatable with a vehicle wheel and having a substantially circular outer periphery, said brake housing having a radially outwardly facing channel cross section providing flanges forming opposed axially spaced braking surfaces extending transverse to the axis of rotation; a stationary brake carrier; a fixed support member mounting said brake carrier with at least its major portion radially outwardly of the outer periphery of said brake housing; a pair of brake shoes mounted on said carrier and extending inwardly of the outer periphery of said brake housing, and each engageable with a respective one of said braking surfaces to arrest rotation of said housing; a relatively elongated and substantially rectilinear brake operator supported on said carrier and extending between said shoes along a secant of the outer periphery of said brake housing; means supported on said brake carrier for reciprocating said brake operator longitudinally of said secant relative to said brake shoes; cooperating wedge surface means on said brake operator and on said brake shoes effective, upon movement of said brake operator in one direction along said secant relative to said brake shoes, to force said shoes apart and into engagement with respective braking surfaces; and mounting means maintaining at least said brake shoes and said operator assembled as a unit; and disengageable means securing said unit to its supporting means for removal of said unit substantially radially outwardly past the circular outer periphery of said brake housing.

2. A disk brake, as claimed in claim 1, in which said disengageable means comprises removable bolt means securing said mounting means to said brake carrier constituting said last-named supporting means.

3. A disc brake, particularly for automotive vehicles, comprising, in combination, a brake housing rotatable with a vehicle wheel and having a substantially circular outer periphery, said brake housing having a radially outwardly opening channel cross section whereby the flanges of said channel cross section form axially spaced and facing braking surfaces transverse to the axis of rotation; a pair of brake shoes disposed within said brake housing and engageable with the respective braking surfaces; a relatively elongated and substantially rectilinear brake operator extending between said brake shoes along a secant of the outer periphery of said brake housing; a stationary brake carrier of radially inwardly facing channel cross section having a circular inner periphery; a fixed support member mounting said brake carrier with its inner periphery spaced radially from the outer periphery of said brake housing; a hydraulic cylinder and piston unit mounted on said brake carrier and closing one end thereof, the piston of said hydraulic cylinder and piston unit being engageable with said brake operator to reciprocate the same longitudinally of said secant relative to said brake shoes; cooperating wedge surface means on said brake surface and on said brake shoes effective, upon movement of said brake operator in one direction by said piston, and relative to said brake shoes, to expand said brake shoes into operative engagement with their respective brake surfaces; removable bolt means supporting said brake shoes and said brake operator on said brake carrier as a removable unit; and a removable cover closing the opposite end of said brake carrier; whereby, upon removal of said cover and of said bolt means, said brake shoes and brake operator may be removed, as a unit, substantially radially outwardly past the circular outer periphery of said brake carrier.

4. A disk brake, as claimed in claim 3, including spring means disposed between the opposite end of said brake operator and said removable cover and biasing said operator to move in the opposite direction to that in which it is moved by said piston.

5. A disk brake, as claimed in claim 3, in which said hydraulic cylinder and piston unit is disengageably secured to said brake carrier.

6. A disk brake, as claimed in claim 3, in which the cylinder of said hydraulic cylinder and piston unit is integral with said brake carrier.

7. A disc brake, particularly for automotive vehicles, comprising, in combination, a brake housing rotatable with a vehicle wheel and having a substantially circular outer periphery, said brake housing having an outwardly opening channel cross section whereby the flanges of said channel form axially spaced facing braking surfaces transverse to the axis of rotation; a pair of brake shoes disposed in said housing and engageable with the respective braking surfaces thereof; a relatively elongated and substantially rectilinear brake operator extending between said brake shoes along a secant of the outer periphery of said brake housing; a stationary brake carrier having a circular inner peripheral portion at least partially surrounding and spaced radially outwardly of the outer periphery of said brake housing; brake operating means effective to reciprocate said brake operator longitudinally of said secant relative to said brake shoes; cooperating wedge surface means on said brake operator and on said brake shoes whereby, upon movement of said brake operator in one direction by said braking operating means, relative to said brake shoes, said brake shoes will be expanded into operative engagement with the associated braking surfaces; means mounting said brake shoes, said brake operator, and said brake operating means on said carrier to form a unit therewith; a fixedly mounted brake holder adjacent said brake carrier and having slots formed therein and opening through its outer periphery; and bolt means extending through said brake carrier and through said slots supporting said brake carrier on said brake holder; whereby, upon loosening of said bolt means, said brake carrier, said brake shoes, said brake, said brake operator and said brake operating means may be readily removed as a unit substantially radially outwardly past the outer periphery of said brake holder.

References Cited by the Examiner
UNITED STATES PATENTS

| | | | |
|---|---|---|---|
| 2,901,059 | 8/1959 | Stacy | 188—73 |
| 3,167,156 | 1/1965 | Davis et al. | 192—70 X |
| 3,194,349 | 7/1965 | Kershner et al. | 188—72 |

MILTON BUCHLER, *Primary Examiner.*

G. E. A. HALVOSA, *Assistant Examiner.*